J. P. ZELLER.
Wheel Hub.
No. 94,685.	Patented Sept. 7, 1869.
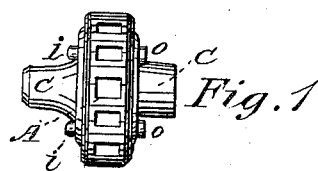
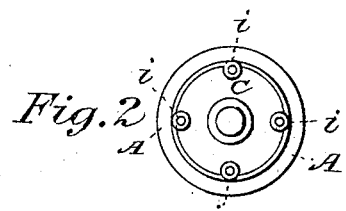
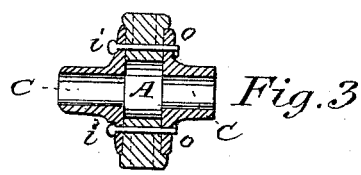
Witnesses:	Inventor:

United States Patent Office.

JOHN P. ZELLER, OF SOUTH BEND, INDIANA.

Letters Patent No. 94,685, dated September 7, 1869.

IMPROVEMENT IN HUBS FOR VEHICLES.

The Schedule referred to in these Letters Patent and making part of the same.

*To all whom it may concern:*

Be it known that I, JOHN P. ZELLER, of South Bend, in the county of St. Joseph, and in the State of Indiana, have invented certain new and useful Improvements in Hubs for Vehicles; and do hereby declare that the following is a full, clear, and exact description thereof, reference being had to the accompanying drawings, and to the letters of reference marked thereon, making a part of this specification.

The nature of my invention consists in the construction of a wagon hub, provided with thimbles, which can be renewed as rapidly as they wear out, without injury to the hub.

Figure 1 is a side elevation of my invention;
Figure 2 is an end view of the same; and
Figure 3 is a horizontal section through the centre.

Letter A represents the hub, which is cast in one solid piece of metal, having openings in its periphery to receive the ends of the spokes, a large opening through the centre, to pass over the end of the axle, and a bed, or depression formed upon each end, so as to receive the thimbles C. This hub can also be formed of wood, if desired, and should always have the opening in the centre so large that the axle can turn freely around, without coming in contact with it at any point.

Resting in the beds formed at each end of the hub, there is a thimble, C, which is held securely in place by means of the bolts $i$ and burrs $o$, the said bolts passing through all three at once, as seen in fig. 3.

The openings through these thimbles are just large enough to fit over the axle, and as they bear all the weight of the wagon, will, sooner or later, wear out; and as rapidly as they do, they can be renewed by others, without injury to the hub.

Heretofore, as soon as the hub became worn, it was not only necessary to throw away the hub, but, generally, the whole wheel. This loss can now be entirely obviated, by simply replacing an old, worn-out thimble by a new one, which can be done with very little trouble, and at a very slight expense.

Having thus described my invention,

What I claim, and desire to secure by Letters Patent, is—

The combination of hub A, provided with an annular recess on each side, with the circumferentially-flanged thimbles C C, which are fitted into said recesses, and secured by the bolts $i$ $i$, as shown and described.

In testimony that I claim the foregoing, I have hereunto set my hand, this 9th day of June, 1869.

JOHN P. ZELLER.

Witnesses:
GEO. PFLEGER, Jr.,
PETER G. STRICKLER.